April 10, 1928.
L. V. FOSTER
1,665,660
PROJECTION APPARATUS
Filed March 28, 1925
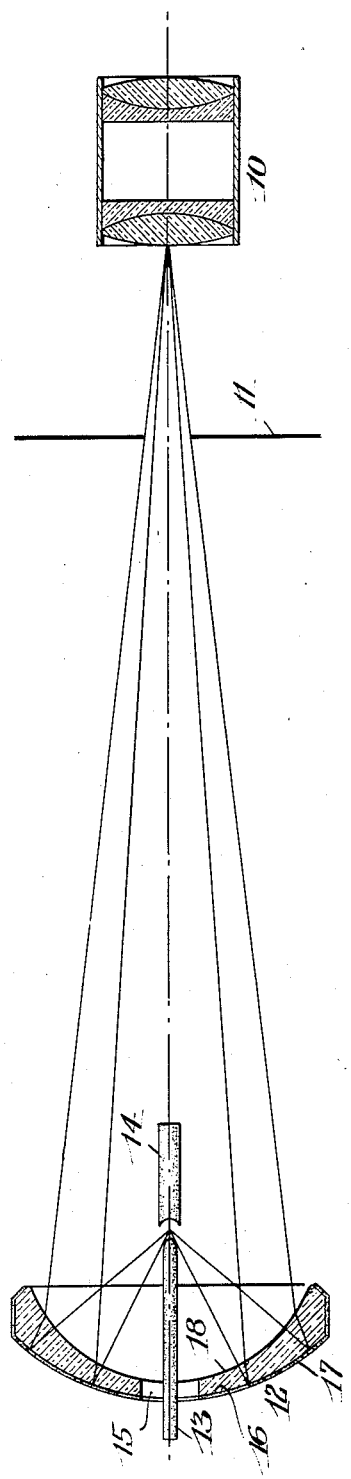
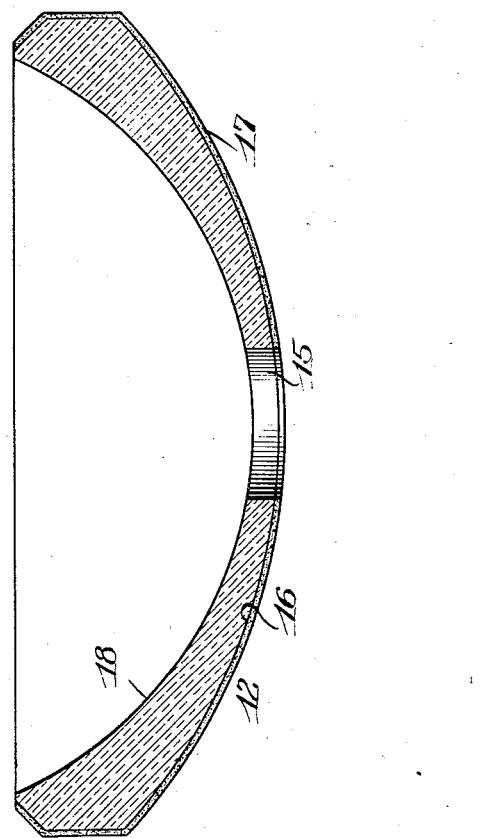
Inventor
Leon V. Foster
By
Frederick F. Church
his Attorney Patented Apr. 10, 1928.

1,665,660

UNITED STATES PATENT OFFICE.

LEON V. FOSTER, OF ROCHESTER, NEW YORK, ASSIGNOR TO BAUSCH & LOMB OPTICAL COMPANY, OF ROCHESTER, NEW YORK, A CORPORATION OF NEW YORK.

PROJECTION APPARATUS.

Application filed March 28, 1925. Serial No. 19,165.

The present invention relates to projection apparatus, and has for its object to provide improvements in apparatus of this kind, particularly with respect to the reflecting means used in the illumination of motion pictures in different types of projecting machines.

Another object of the invention is to provide in combination with motion picture projection apparatus an improved reflector for focusing the light to form a real image at the back of the projection lens so that the film gate will intercept the beam of light where the even intensity of illumination is greatest over the entire aperture.

A further object of the invention is to provide, for use in motion picture projection apparatus, a reflector embodying a focusing mirror corrected for spherical aberration and therefore differing from the spherical mirror which is spherically undercorrected, the improved results being accomplished by combining with the reflecting surface of the mirror a negative lens spherically overcorrected, whereby the two aberrations neutralize one another, due to the proper coordination of the radii of the front and rear spherical curves of the mirror in conjunction with the use of a medium of high refractive index between said surfaces. This combination affords a relatively inexpensive mirror which can be easily ground and polished with ordinary opticians' tools and which permits the light source to be used at a safe distance from the glass without sacrificing any of light or producing uneven screen illumination.

To these and other ends the invention resides in certain improvements and combinations of parts, all as will be hereinafter more fully described, the novel features being pointed out in the claims at the end of the specification.

In the drawings:

Figure 1 represents diagrammatically one embodiment of the invention, and

Figure 2 is an enlarged sectional view of the improved reflector.

Similar reference numerals throughout the several views indicate the same parts.

In motion picture projection apparatus, particularly in small theaters, the direct current reflecting arc lamp has been used for illuminating purposes due to the low consumption of current with lamps of this type while the reflector employed has generally been either a parabolic mirror or spherical mirror.

Although a parabolic reflector is free from spherical aberration if the object is in the focal point and the image formed at infinity, yet in the application of a parabolic mirror to the problem of motion picture projection the light source is farther from the mirror than the focal point, and the image is formed at a finite distance from the mirror. This produces a condition of spherical overcorrection, causing considerable loss of light and uneven screen illumination.

While a spherical reflector may be free from spherical aberration if the object and image are at the center of curvature of the mirror, still such a reflector, under the same arrangement as above mentioned, produces a condition of spherical undercorrection and suffers in the same manner as the parabolic reflector, though to a greater extent. The parabolic mirror can be made large enough to include a solid angle of light of 120° but the spherical mirror cannot be made to include more than 100° of useful illumination. The surface of rotation in which an object is imaged by reflection, without spherical aberration, would be ideal in arc lamp projection apparatus for motion picture projection. Such a surface is an ellipsoid of revolution but is very difficult and expensive to make from glass.

In the present invention I have illustrated diagrammatically a portion of a motion picture projection apparatus, including a suitable projection lens 10 of any well known type, a diaphragm 11 of any preferred form and my improved reflector, indicated generally at 12, along with a suitable source of light embodying the electrodes 13 and 14, with which may be employed a suitable feeding mechanism, not shown, the electrode 13 being projected through an opening 15 in the center of the mirror as shown in Figure 1. The reflector 12 is one in which spherical curves are used but with the radius of curvature of the rear surface 16, having a coating 17, differing from that of the curvature of the front surface 18. The present mirror, by way of example is one in which the front surface has a radius of curvature preferably equal to 76.0 mm. while the rear or silvered surface has a radius of curvature preferably of 113.0 mm., the arc being located approximately 3″ from the inner face of the mirror at a point on the axis thereof and the focal length of the mirror being 71.0 mm. While this mirror is similar in shape to the well known Mangin mirror it differs therefrom in that the latter is adapted to project parallel rays of light while the present reflector is a focusing mirror capable of projecting a concentrated light on the axis of the projection lens to produce a real image in or adjacent the back of the lens so that the film gate will intercept the beam of light where the even intensity of illumination is greatest over the entire aperture, as stated above.

The present mirror though analogous to a spherical mirror, which is spherically undercorrected, differs therefrom in having a combined negative lens which is spherically overcorrected, whereby the two aberrations are such as to neutralize one another. This results in a mirror corrected for spherical aberration which is comparable with the corrections of the ellipsoid of revolution and affords a mirror which can be both accurately and easily ground and polished and therefore economically produced. This type of mirror can be made large enough to include a solid angle of light of 120° which is desirable in motion picture projection apparatus.

An important feature of the present reflector is that it permits the arc or light source to be placed at a relatively safe distance from the mirror. As will be understood, there exists between a spherical and a parabolic mirror of the same focal length and relative aperture, a difference in shape, the parabolic mirror being more shallow than the spherical mirror. This difference in shape permits the spherical mirror to be made smaller in diameter to give the same relative aperture as the parabolic mirror but the periphery of the former approaches nearer to the arc. It is not practical to place a glass surface too close to the arc lamp, for reasons which are evident, namely, the heat of the arc may crack the glass and the carbon particles thrown off from the arc may hit the surface of the glass. The surface of the mirror as stated above is preferably three inches away from the arc crater, a sufficient distance to avoid pitting. In order to avoid breaking of the glass, due to a sudden change of temperature, this mirror is preferably made from a material having a low coefficient of expansion, such as quartz or a heat resisting glass.

It is to be understood that other mirrors having the same correction for spherical aberration, but of different focal lengths from the one mentioned above, may be made by applying a constant ratio to the curves, thickness and diameter. Such mirrors would have a constant magnification, but the object and image distances will be in the same ratio as the focal length ratio. Furthermore, other mirrors having different corrections for spherical aberration where the ratio of the object to image distance, or magnification is different can also be constructed in keeping with the principles set forth herein.

I claim as my invention:

1. In a projection apparatus the combination with a projection lens and a light source, of a mirror adapted to form near the projection lens an image of the source of light, said mirror being formed with front and rear spherical surfaces separated by a medium of high refractive index, the front and rear surfaces having spherical undercorrection which is compensated for by overcorrection afforded by the medium of high refractive index lying between said surfaces.

2. A reflector adapted to form at a finite distance a real image of a source of light, said reflector embodying front and rear surfaces having spherical undercorrection compensated for by overcorrection afforded by a medium of high refractive index lying between said surfaces, whereby to produce a mirror substantially free from spherical aberration for the said finite image distance.

3. A reflector for use in motion picture projection apparatus embodying front and rear spherical surfaces separated by a transparent medium of high refractive index, the rear surface being coated to form a mirror, the radii of curvature of said front and rear surfaces being substantially in the proportions of 76 to 113, respectively.

LEON V. FOSTER.